(No Model.)

E. C. JUDD.
SOLE LEVELING AND BURNISHING MACHINE.

No. 519,187. Patented May 1, 1894.

WITNESSES:
F. M. Whipple
Parker Davis

INVENTOR:
E. C. Judd
by Wight Brown Crosley
Attys.

UNITED STATES PATENT OFFICE.

EDWARD C. JUDD, OF BOSTON, MASSACHUSETTS.

SOLE LEVELING AND BURNISHING MACHINE.

SPECIFICATION forming part of Letters Patent No. 519,187, dated May 1, 1894.

Application filed August 17, 1893. Serial No. 483,372. (No model.)

*To all whom it may concern:*

Be it known that I, EDWARD C. JUDD, of Boston, in the county of Suffolk and State of Massachusetts, have invented certain new and useful Improvements in Sole Leveling and Burnishing Machines, of which the following is a specification.

This invention has for its object to combine in one machine a sole leveler and burnisher whereby the leveling and burnishing of the bottoms of soles of boots and shoes can be accomplished in one and the same operation.

To the above end the invention may be said to consist broadly in an organized mechanism comprising a leveling roll, means for oscillating or reciprocating it, and means for positively rotating it at the same time.

The accompanying drawings illustrate a construction by which the invention may be carried out.

Figure 1:
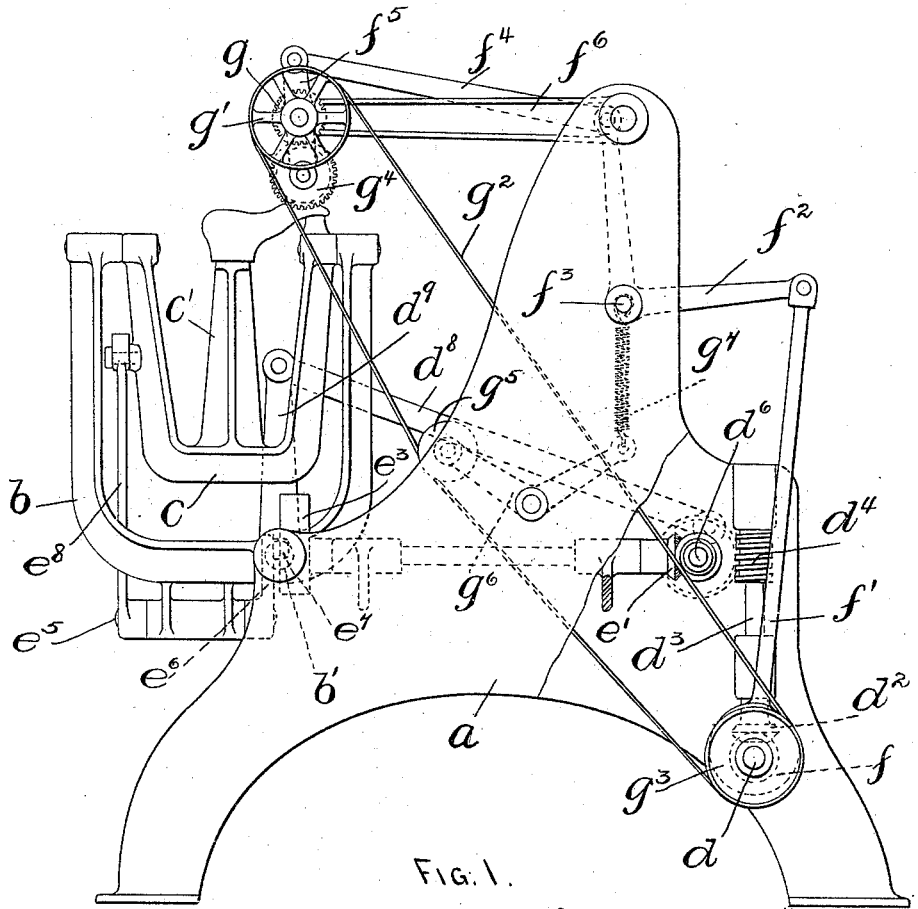
Figure 2:
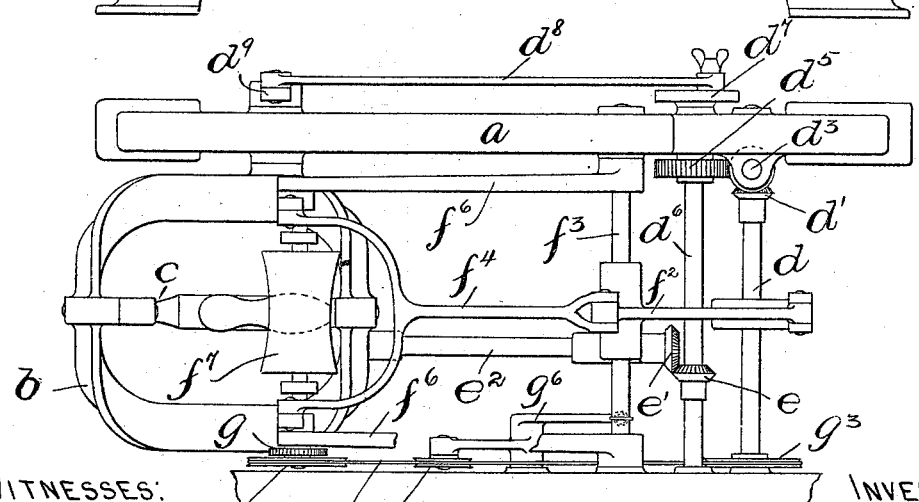

Figure 1 shows a side elevation of a machine embodying the invention. Fig. 2 shows a top plan view.

The same letters of reference indicate the same parts in both figures.

In the drawings: the letter $a$ designates the supporting-frame of the machine; $b$ a yoke or tree, pivoted at $b'$ to the said frame, so as to oscillate longitudinally of the machine; and $c$ another yoke, pivotally supported in the yoke $b$, and having a centrally-located standard $c'$ constructed at its upper end to receive the last on which the shoe is held.

The letter $d$ designates the driving-shaft, supported in bearings on the frame $a$, and carrying a bevel-gear $d'$, which meshes with a similar gear $d^2$ on a vertical shaft $d^3$. Said vertical shaft carries a worm $d^4$, which engages a gear $d^5$ mounted on a horizontal shaft $d^6$, said shaft carrying a crank-disk $d^7$, to which is connected one end of a rod $d^8$, the opposite end of which is connected with an arm $d^9$ fastened to one of the journals of the jack-tree $b$. It will be understood that the latter is oscillated through the media described. The shaft $d^6$ carries a bevel-gear $e$, which meshes with a similar gear $e'$ on a shaft $e^2$, which is supported in bearings on the frame $a$, and extends at right angles to the said shaft $d^6$. A disk $e^3$ is fixed on the end of the shaft $e^2$, and has a cam-groove in its outer face. This cam-groove is partly in a plane which includes the center of oscillation or axis of the tree $b$. A rock-shaft $e^5$ is supported in a bearing on the under side of the tree $b$, and has an arm $e^6$ on one end, which arm carries a roller $e^7$ in engagement with the cam-groove in the disk $e^3$, said rock-shaft has an arm $e^8$ on the opposite end, which is connected with the yoke $c$. Through these instrumentalities the said yoke is oscillated, and it will be observed that the connection of parts is not disturbed by the oscillations of the tree $b$, by reason of the fact that the cam-groove is brought into the plane of the axis of the tree, whereby the roll $e^7$ engaging it will have a very slight movement. The sides of this roller are rounded to prevent it from binding in the groove.

An eccentric $f$ on the driving-shaft $d$ is connected by a rod $f'$ with one arm of a bell-crank $f^2$, which is pivoted by means of a shaft $f^3$ supported in the frame $a$. Said bell-crank has a vertically-extending arm, which is jointed to a rod $f^4$, and the latter has a forked outer end whose branches are jointed to cross-heads $f^5$. Said cross-heads are supported by arms $f^6$ pivoted to the frame $a$, and they form bearings for a roll $f^7$ which they carry between them. Said roll has position over the ball of the sole, and through the parts described an oscillatory motion is imparted to it as it acts on the sole. This action of the roll levels the sole, while the latter is rocked longitudinally and laterally by the yokes $b$ and $c$.

In order to secure a burnishing effect the roll must be positively revolved, and this is brought about at the same time that the oscillations take place through the following means: A gear $g$ is supported concentrically with the pivot of the roll-bearings $f^5$, and a pulley $g'$ is fixed to rotate with said gear. A belt $g^2$ connects said pulley with a pulley $g^3$ on the driving shaft $d$, and a gear $g^4$ meshes with the gear $g$ and is fixed to rotate with the roll $f^7$. Through these means a positive rotation is imparted to the roll, and its oscillations do not effect the transmission of rotary motion, for the gear $g$ is concentric with the pivot of the roll-bearings. A tension-roller $g^5$ supported by a lever $g^6$ is actuated by a spring $g^7$ against the belt $g^2$, and maintains the same taut. It will now be seen that the roll is oscillated or reciprocated and rotated positively, at the same time, and thereby the sole is both leveled and burnished.

The inventiom may be embodied in a different form than here shown and is not therefore limited in this respect.

The invention results in a great saving in time and labor, as heretofore two successive operations have been necessary to level and burnish soles, both of which are accomplished in one operation in a machine embodying my invention.

Having thus described my invention, what I claim as new, and desire to secure by Letters Patent, is—

1. A machine of the character described comprising in its construction, a leveling and burnishing roll supported in oscillatory bearings, oscillating means connected with said bearings, and producing reciprocations of the roll, and driving mechanism connected with said roll and adapted to rotate the same simultaneously with the reciprocations thereof.

2. A machine of the character described, comprising in its construction a leveling and burnishing roll, rocker arms supporting the same, a gear which is concentric with the bearings of said arms, another gear affixed to the shaft of the roll, means for rotating the first-named gear and thereby the roll, and means for oscillating or reciprocating the rocker arms.

In testimony whereof I have signed my name to this specification, in the presence of two subscribing witnesses, this 10th day of August, A. D. 1893.

EDWARD C. JUDD.

Witnesses:
C. F. BROWN,
F. PARKER DAVIS.